United States Patent

[11] 3,576,463

[72] Inventor Padmanabh Shukla
Chicago, Ill.

[21] Appl. No. 795,963
[22] Filed Feb. 3, 1969
[45] Patented Apr. 27, 1971
[73] Assignee Admiral Corporation
Chicago, Ill.

[54] LINE STABILIZED VERTICAL DEFLECTION SYSTEM
9 Claims, 2 Drawing Figs.

[52] U.S. Cl. .......... 315/26, 315/24, 315/27R
[51] Int. Cl. .......... H01j 29/70
[50] Field of Search .......... 315/307, 26, 24, 2?

[56] References Cited
UNITED STATES PATENTS
2,631,260 3/1953 Maron .......... 315/26
2,846,617 8/1958 Nelson .......... 315/24

*Primary Examiner*—Richard A. Farley
*Assistant Examiner*—Joseph G. Baxter
*Attorney*—Nicholas A. Camasto

ABSTRACT: The television receiver vertical deflection output tube is supplied with DC operating potentials undesirably fluctuating in accordance with fluctuations in the AC line voltage, causing objectionable raster size changes. A separate rectifier circuit produces a relatively large negative DC voltage in which the fluctuations are oppositely poled to those in the DC operating potentials. The negative DC voltage is combined with a substantially constant positive DC voltage of similar magnitude, obtained from the boost source, for producing a compensatory signal consisting essentially only of the oppositely poled fluctuations. The compensatory signal is coupled to the input of the vertical output tube and maintains the translation characteristic thereof substantially constant.

Figure 1:
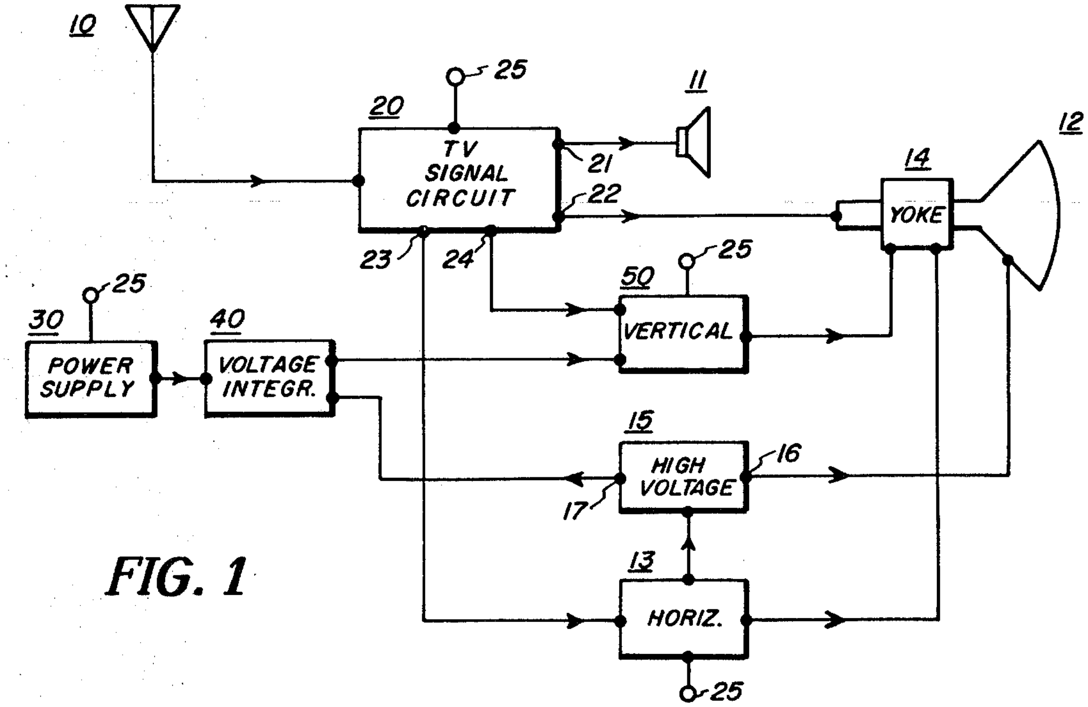

INVENTOR.
Padmanabh J. Shukla
BY
Nicholas A. Camasto
Atty.

LINE STABILIZED VERTICAL DEFLECTION SYSTEM

This invention relates, in general, to signal translation means having operating potentials subject to undesirable voltage fluctuations, and in particular to vertical signal translation circuitry of the type used for energizing electromagnetic deflection coils in television receivers. More particularly, this invention relates to circuitry of the type described having compensatory means for neutralizing the adverse effects of the fluctuations in the aforementioned operating potentials.

In conventional television receivers, individually selected wave signals are heterodyned with locally generated oscillatory signals for producing audio and video intermediate frequency IF carrier signals. The video IF signal is detected and the resulting composite video signal is amplified and coupled to a control electrode of a television picture tube for intensity modulating its electron beam.

The composite video signal also contains synchronizing signal information, hereafter referred to as sync information, which is removed in a sync separator. The sync signals control the operation of the horizontal and vertical deflection signal generating circuits whose sawtooth outputs are coupled to appropriate deflection coils for properly deflecting the intensity modulated electron beams over the picture tube screen where the transmitted image is reproduced.

Conventional television receivers require DC operating potentials derived by rectifying and filtering an AC voltage obtained from an ordinary household outlet. These operating potentials supply all of the signal processing circuits, particularly the vertical and horizontal output circuits, and determine the signal translation characteristics thereof. The magnitude of the sawtooth waveform produced by the vertical output circuit is proportional to the aforementioned operating potentials. (To a much less degree is this true for the horizontal circuit). Therefore fluctuations in line voltage, which are reflected in its operating potentials, adversely affect the magnitude of the vertical sawtooth waveform.

The size of the raster reproduced on the picture screen is a function of the magnitude of the sawtooth waveforms produced by the vertical and horizontal output circuits. For example, if the magnitude of the vertical waveform decreases, the raster compresses into a smaller vertical area, and if the magnitude of this sawtooth increases the raster expands beyond the confines of the picture tube viewing screen, thereby masking its upper and lower portions from view.

The horizontal system is relatively immune to changes in B+ because the high voltage, derived from the horizontal circuit, controls, to a large extent, the horizontal scanning distance. For example, the scan may be reduced by reducing the horizontal output or increasing the high voltage (accelerating the beam more and thus making it less responsive to deflection forces). Hence, since reduced horizontal output gives rise to reduced high voltage, (the beam becomes easier to deflect), the system may be designed to keep the scanning distance relatively constant in the event of any spurious B+ voltage changes. Unfortunately, this type of interdependence is not readily achieved between the vertical and high voltage circuits since they are not directly connected.

One method for preventing undesirable vertical raster changes due to fluctuating operating potentials utilizes a zener diode connected across the fluctuating DC voltage. As is well-known in the art, the operating characteristics of the zener diode are such that the voltage across the diode remains substantially constant, even though the current passing therethrough undergoes relatively large variations. As a result, the Zener diode is widely used as a voltage regulating device. However, in the television environment where large current surges often occur, proper voltage regulation is achieved only with expensive diodes having high power dissipating capabilities, and for this reason other voltage regulating techniques would be most desirable.

The circuit of the invention maintains proper vertical raster size by providing means for producing a compensatory signal which neutralizes the adverse effects of fluctuations in the DC operating potentials. The invention includes separate means for rectifying and filtering the variable AC voltage, to develop negative DC voltage fluctuations in response to the variations in the AC voltage. This negative DC voltage is combined with a substantially constant positive voltage of similar magnitude obtained from the conventional boost voltage source in the receiver. The resulting compensatory signal, having a nominal DC level near zero volts, undergoes relatively large voltage fluctuations, percentagewise, in response to relatively small percentage variations in the AC voltage. Since these fluctuations are oppositely poled with respect to the fluctuations in the DC operating potentials, the compensatory signal may be coupled to the input of the vertical circuit for offsetting the changes in gain caused by the fluctuations in the DC operating potentials. Thus, when a spurious change in the AC voltage is reflected in the operating potentials, an opposite change occurs in the compensatory signal, whereby the magnitude of the vertical sawtooth waveform is held substantially constant.

Accordingly, the primary object of this invention is to provide improved means for compensating for the undesirable fluctuations in the DC operating potentials applied to the vertical output circuit in television receivers.

Another object of this invention is to provide means deriving a compensatory signal fluctuating inversely with undesirable fluctuations in the operating potentials applied to the vertical output circuit in television receivers for neutralizing the adverse effects of such undesirable fluctuations.

A further object of this invention is to provide means for rectifying and filtering an AC voltage subject to spurious fluctuations, combining the rectified voltage with a constant positive DC voltage for producing a compensatory signal varying inversely with the variations in the AC voltage, and using the compensatory signal to neutralize the adverse effects of the fluctuations in the DC operating potentials which supply the vertical output circuit in television receivers.

Figure 2:
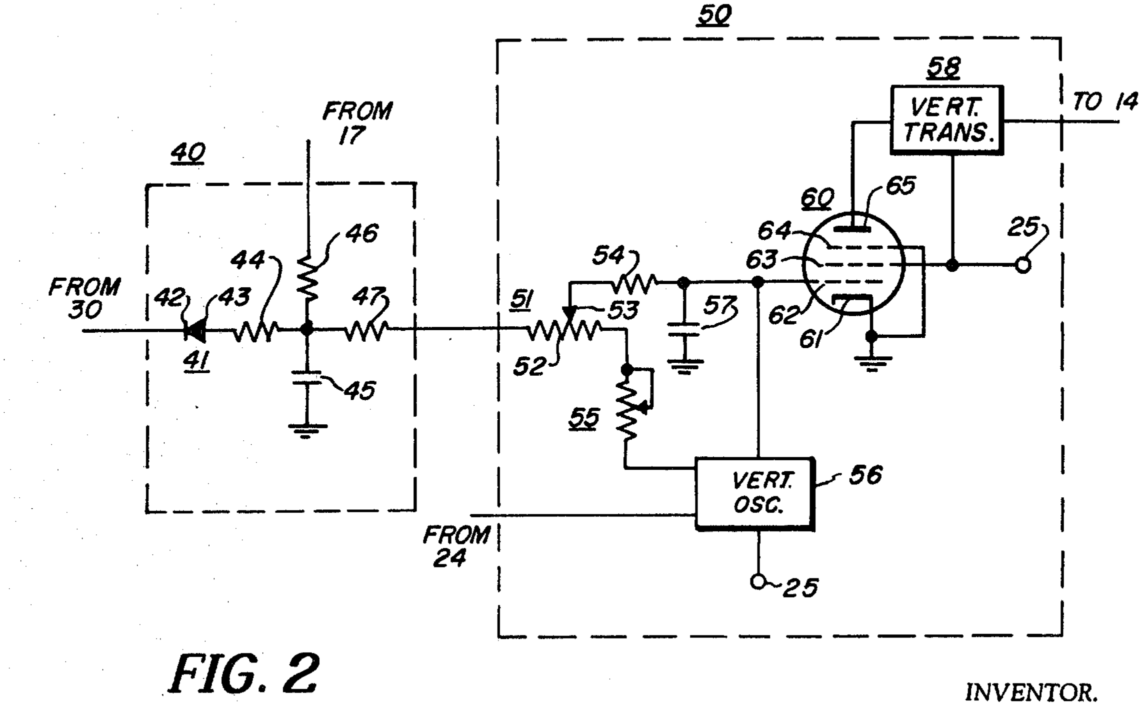

Other objects, features and advantages of this invention will be apparent upon reading the following description in conjunction with the accompanying drawings in which:

FIG. 1 is a block diagram of a television receiver incorporating the invention; and FIG. 2 is a circuit diagram of the inventive portion of the receiver shown in FIG. 1.

Referring now to FIG. 1, an antenna 10, coupled to a television signal circuit 20, receives a plurality of television wave signals each containing modulated audio and video carrier signals. Circuit 20 is conventional and may contain heterodyning circuitry for individually selecting any one of the abovementioned wave signals, and detection circuitry for separating the resulting audio IF signal from the video IF signal. Circuit 20 may also include means for demodulating and amplifying the audio IF signal and passing the recovered sound program material to an audio output terminal 21. Terminal 21 is connected to a conventional loudspeaker 11 where the sound program material is reproduced.

Television signal circuit 20 may also include an energizing terminal 25, at which a DC energizing voltage for supplying the various components in circuit 20 is received, and circuitry for demodulating and amplifying the video IF signal to produce a composite video signal. The composite video signal is coupled to a video output terminal 22 and also feeds a sync separator in signal circuit 20. Video output terminal 22 is connected to a television picture tube 12, and in accordance with conventional television operation, the video signal is passed to the picture tube for intensity modulating the electron beam emanating from the cathode thereof. It is well-known that this electron beam is deflected across the picture screen of the picture tube for reproducing the transmitted television image.

The sync separator in signal circuit 20 may contain circuitry for producing horizontal and vertical synchronizing signals which are passed to a horizontal terminal 23 and a vertical terminal 23 and a vertical terminal 24, respectively. A horizontal output circuit 13, having a DC energizing terminal 25, is connected between horizontal terminal 23 of television signal circuit 20 and a picture tube yoke 14. Yoke 14 is conventional and comprises horizontal and vertical deflection coils which are wound about a core secured to the neck of picture tube 12. As is well-known in the art, horizontal output circuit 13 produces a sawtooth waveform which is coupled through a transformer (not shown) to the appropriate deflection coils in yoke 14 for producing an electromagnetic field for properly deflecting the electron beam across the picture screen.

The transformer in horizontal circuit 13 is also connected to a high voltage source 15 having a pair of terminals 16 and 17. High voltage source 15 is conventional and develops a very large DC voltage at terminal 16 and a much smaller, substantially constant positive boost voltage at terminal 17. Terminal 16 of high voltage source 15 is connected to picture tube 12, passing the large DC voltage thereto, and output terminal 17 is connected to a voltage integrator 40. As will be explained below, a portion of the positive boost voltage is passed to voltage integrator 40 where it is combined with a fluctuating negative DC voltage (derived from the AC line) to form the compensatory signal.

A vertical vacuum tube output circuit 50, also having a DC energizing terminal 25, is connected to vertical terminal 24 in television signal circuit 20. Vertical output circuit 50, like horizontal circuit 13, is connected to yoke 14 and produces a sawtooth waveform which is passed through a vertical transformer (not shown) to the appropriate deflection coils in the yoke. The vertical deflection coils contribute to the electromagnetic field produced by the horizontal deflection coils, for deflecting electrons across the picture screen of picture tube 12.

An AC power supply 30, which may be fed from an ordinary household outlet, contains DC means including rectifying and filtering circuits for producing DC operating potentials which appear at energizing terminal 25. These DC operating potentials are subject to spurious variations in accordance with variations in the AC line. Power supply 30 is also connected to a voltage integrator 40, and passes a portion of the AC voltage thereto. As discussed above, the DC operating potentials are subject to undesirable voltage fluctuations which adversely affect the magnitude of the sawtooth waveform produced at vertical circuit 50. However, as will be explained below, these adverse effects are neutralized by the compensatory signal produced by voltage integrator 40 and passed to vertical circuit 50.

Referring now to FIG. 2, voltage integrator 40 comprises a diode 41 having a cathode 42 and an anode 43. Diode 41 is connected to power supply 30, and oriented to block the positive portion of the AC voltage passed therefrom. A resistor 44 is connected between anode 43 of diode 41 and the ungrounded end of a grounded capacitor 45. Resistor 44 and capacitor 45 comprise an RC filter for smoothing the negative portion of the AC voltage appearing at anode 43. A current-limiting resistor 46 is connected between high voltage source 15 and the ungrounded end of capacitor 45, whereby the substantially constant positive boost voltage produced by the high voltage source and appearing at terminal 17 thereof is combined with the rectified, filtered voltage to produce the compensatory signal. Resistors 44 and 46 are adjusted such that the DC level of the compensatory signal is equal to zero volts.

In view of the foregoing, it should be apparent that the compensatory signal consists of the aforementioned voltage fluctuations, and that when the AC line voltage increases, the compensatory signal becomes more negative, thereby decreasing, and when the AC voltage decreases, the compensatory signal becomes less negative, thereby increasing. Further, since the compensatory signal is formed by combining the AC voltage, rectified in the voltage integrator, with the equal but oppositely poled boost voltage, produced by the high voltage circuitry, the compensatory signal is subject to relatively large voltage swings in response to the variations in the AC line.

The compensatory signal is passed to vertical output circuit 50 through a resistor 47, connected to the ungrounded end of capacitor 45. The vertical output circuit includes a linearity control 51 comprising a resistance element 52 connected between resistor 47 and a vertical hold control 55, and a tap 53 movably connected to resistance element 52. As explained below, the voltage taped off resistance element 52 determines the magnitude of the sawtooth waveform produced by vertical circuit 50, and ultimately, the height of the picture image. This voltage varies in accordance with the difference between the DC level of the compensatory signal, which is generally zero, and a negative voltage appearing across hold control 55. The position of tap 53 also determines the slope of the sawtooth waveform produced by vertical circuitry 50 and as is well-known in the art, best picture fidelity results when this slope is substantially linear.

Vertical circuit 50 further includes a vacuum tube 60 having a grounded cathode 61, a control grid 62, a screen grid 63, a suppressor grid 64 and an anode 65 at which the vertical sawtooth waveform is produced. A vertical oscillator 56, having an energizing terminal 25, is connected between vertical hold control 55 and control grid 62. Oscillator 56 receives the vertical synchronizing signal from terminal 24 of television circuit 20, and energizes vacuum tube 60 with an oscillatory signal which, as is well-known in the art, determines the frequency of the waveform produced at anode 65. Oscillator 56 also provides the negative voltage applied across hold control 55.

Screen grid 63 of vacuum tube 60 is connected to DC energizing terminal 25, suppressor grid 64 is returned to cathode 61, and anode 65 is coupled through a vertical transformer 58 to the appropriate deflection coil in yoke 14. Energizing terminal 25 is also coupled to transformer 58 for supplying DC voltage operating potential to anode 65. A resistor 54, connected between tap 53 and control grid 62, and a capacitor 57, connected between grid 62 and ground, present a reactance, ultimately determined by the position of tap 53, to the control grid of vacuum tube 60. As is well-known in the art, it is this reactance which determines the slope of the vertical output sawtooth waveform, and proper adjustment of tap 53 assures linearity thereof.

As described above, the DC operating potentials obtained from the power supply are applied through the energizing terminal of the vertical circuit to the screen grid and the anode electrode of vacuum tube 60. These operating potentials establish the translation characteristics of the vacuum tube, and as a result, determine the magnitude of the sawtooth waveform produced at the anode thereof. However, since the operating potentials fluctuate in response to the spurious variations in the AC line voltage, the resulting waveform is, as discussed above, also susceptible to undesirable variations.

Thus, when the AC line voltage suddenly decreases, due to the start-up of an electric motor, for example, the DC operating potentials applied to the screen grid and the anode of the vertical output vacuum tube will decrease by a proportional amount. In accordance with conventional vacuum tube operation, this change in operating potentials decelerates the electrons passing from the cathode to the anode of the tube, and consequently, the anode current will decrease, causing the magnitude of the sawtooth current to decrease proportionally. But, in accordance with the circuit of the invention, this effect is neutralized by the relatively large fluctuations in the compensatory signal. Thus, when the AC voltage spuriously decreases, the compensatory signal will increase by a relatively large amount, causing the voltage tapped off the resistance element of the linearity control to become less negative. As a result, the voltage applied to the control grid of the vacuum tube also becomes less negative, thereby accelerating the electrons in transit from cathode to anode. This accelerating effect neutralizes the retarding forces due to the decrease in operating potentials, whereby the anode current, and hence the resulting sawtooth current remains constant.

Though the fluctuations in the compensatory signal alter the voltage across resistance element 52 of linearity control 51, the reactance presented to the control grid of the vacuum tube in unchanged, and hence the slope of the sawtooth waveform remains linear. Thus, in view of the foregoing, it is apparent that fluctuations in the compensatory signal preserve the established translation characteristics of the vacuum tube without disturbing the slope of the waveform and therefore, the image reproduced on the picture screen is a faithful reproduction of the original picture. Note may be made of the fact that with no voltage regulation, the image may vary 10 percent in the vertical direction in response to a 10 percent change in line voltage, but when the circuitry of the invention is incorporated in the receiver, the same change in line voltage yields only a 2 percent change in raster size. Typical parameters for this circuit are as follows:

| | |
|---|---|
| tub **60** | 24JZ8 |
| resistance element **52** | 0.500K ohms |
| hold control **55** | 1.2 Megohms |
| resistor **54** | 1.2 Megohms |
| capacitor **57** | 0.039 microfarad |

The embodiments of the invention in which an exclusive property or privilege is claimed are defined as follows:

I claim:

1. In combination: signal translation means; an AC voltage supply producing an AC voltage subject to spurious voltage variations; DC means coupled to said AC voltage supply, deriving DC operating potential for said signal translation means, said DC operating potential undesirably fluctuating as a result of said spurious voltage variations; high voltage means producing a substantially constant DC voltage; rectifying means, coupled to said AC voltage supply, producing a variable DC voltage opposite in polarity and similar in magnitude to said constant voltage; and circuit means, coupled to said signal translation means, combining said variable voltage with said constant voltage, and producing a compensatory signal fluctuating inversely with said fluctuations in said DC operating potential, whereby said compensatory signal neutralizes the effect of said fluctuations.

2. The combination as set forth in claim 1 wherein said signal translation means comprise a vacuum tube, and wherein said rectifying means comprise a diode oriented to pass only the negative portion of said AC voltage.

3. The combination as set forth in claim 2, wherein said vacuum tube includes a first and a second grid electrode, and an anode electrode; means supplying said DC operating potential to said first grid electrode and to said anode electrode; and means coupling the compensatory signal developed in said circuit means to said second grid electrode, whereby the fluctuations in said DC operating potential do not adversely affect the translation characteristics of said vacuum tube.

4. The combination as set forth in claim 3 further including; a television picture tube; means, including said vacuum tube, for producing a raster on said picture tube, the size of said raster being a function of the output of said vacuum tube and any fluctuation therein being readily observable.

5. In a television receiver having a vertical output vacuum tube producing a vertical output signal dependent on the translation characteristics thereof, the combination of: an AC voltage supply subject to spurious voltage variations; DC means coupled to said AC voltage supply, producing DC operating potential for said vacuum tube; said DC operating potential undesirably fluctuating in response to said spurious voltage variations; high voltage means, producing a constant DC voltage; rectifying means, coupled to said AC voltage supply producing a variable DC voltage opposite in polarity and similar in magnitude to said constant DC voltage; and circuit means combining said variable DC voltage with said constant DC voltage for producing a compensatory signal, fluctuating inversely with said fluctuations in said DC operating potential and means coupling said compensatory signal to said vacuum tube to neutralize the effects of said fluctuations in said operating potential by maintaining the translation characteristics of said vacuum tube substantially constant.

6. The combination as set forth in claim 5 wherein said rectifying means include; a diode having a cathode coupled to said AC voltage supply and an anode; a capacitor having a grounded end and an ungrounded end; and a first resistor coupled between said anode and said ungrounded end of said capacitor, whereby said variable signal has a negative DC level, which becomes more negative when said AC voltage increases, and less negative when said AC voltage decreases.

7. The combination as set forth in claim 6 wherein said circuit means include a second resistor, coupled between said ungrounded end of said capacitor and said high voltage means, for combining said constant voltage with said variable voltage.

8. The combination as set forth in claim 7 wherein said vertical output vacuum tube includes; an anode, a screen grid and a control grid; means applying said fluctuating DC operating potential to said anode and said screen grid; means applying said compensatory signal to said control grid, the magnitude of said vertical output signal being determined by the voltages on said anode, screen grid and control grid, thereby being maintained substantially constant despite fluctuations in said operating potential.

9. The combination as set forth in claim 8 further including a television picture tube including deflection circuitry driven by said vertical output vacuum tube; the height of said raster being determined by the output signal from said vertical output tube and remaining substantially constant.